(12) United States Patent
Bzorgi

(10) Patent No.: US 7,673,392 B1
(45) Date of Patent: Mar. 9, 2010

(54) POWERED PROTRUSION CUTTER

(75) Inventor: Fariborz M. Bzorgi, Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 411 days.

(21) Appl. No.: 11/612,852

(22) Filed: Dec. 19, 2006

(51) Int. Cl.
*B26D 1/04* (2006.01)

(52) U.S. Cl. .............................. 30/180; 30/182; 30/228; 30/241

(58) Field of Classification Search ............... 30/175, 30/180, 182, 228
See application file for complete search history.

(56) References Cited

U.S. PATENT DOCUMENTS

| | | | | |
|---|---|---|---|---|
| 1,320,191 A | * | 10/1919 | Ash | 30/168 |
| 1,411,785 A | * | 4/1922 | Hoiland | 30/193 |
| 1,554,790 A | * | 9/1925 | Crowe | 30/168 |
| 2,714,250 A | * | 8/1955 | Twedt | 30/180 |
| 3,177,584 A | * | 4/1965 | Cockerill | 30/228 |
| 4,026,028 A | * | 5/1977 | Green | 30/233 |
| 4,292,833 A | * | 10/1981 | Lapp | 72/416 |
| 4,474,178 A | * | 10/1984 | Hyatt | 606/163 |
| 6,792,789 B1 | * | 9/2004 | Faucher | 72/456 |

OTHER PUBLICATIONS

Shore International Corporation, "End Cutters and Oblique Cutters" (date unknown) http://shorinternatinal.com/pliersend.htm (4 pages).
MYTOOLSTORE.COM, "Cable Tools & Bolt Cutters" (date unknown) http://www.mytoolstore.com/klein/kln03.html (3 pages).
Hanes Supply, Inc., "Hydraulic Hand Tools" (date unknown) http://www.hanessupply.com/catalog_pdfs/14-Hydraulics. 50_200311_PDF.pdf (page# 14-1) (1 page).

* cited by examiner

*Primary Examiner*—Hwei-Siu C Payer
(74) *Attorney, Agent, or Firm*—Michael J. Renner; Luedeka, Neely & Graham, P.C.

(57) ABSTRACT

An apparatus for clipping a protrusion of material is provided. The protrusion may, for example, be a bolt head, a nut, a rivet, a weld bead, or a temporary assembly alignment tab protruding from a substrate surface of assembled components. The apparatus typically includes a cleaver having a cleaving edge and a cutting blade having a cutting edge. Generally, a mounting structure configured to confine the cleaver and the cutting blade and permit a range of relative movement between the cleaving edge and the cutting edge is provided. Also typically included is a power device coupled to the cutting blade. The power device is configured to move the cutting edge toward the cleaving edge. In some embodiments the power device is activated by a momentary switch. A retraction device is also generally provided, where the retraction device is configured to move the cutting edge away from the cleaving edge.

9 Claims, 3 Drawing Sheets

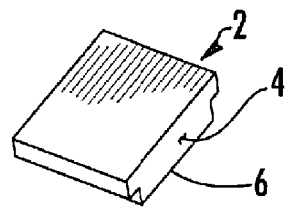
FIG. 1A
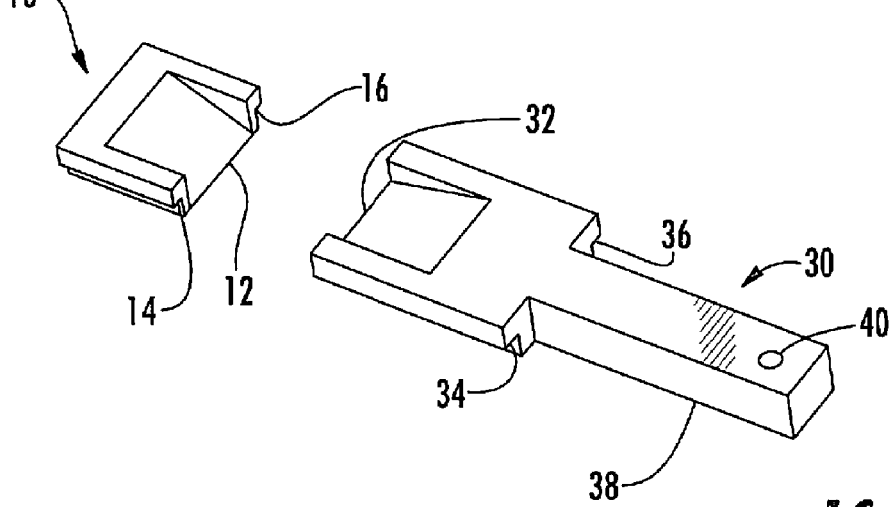
FIG. 1B
FIG. 1C
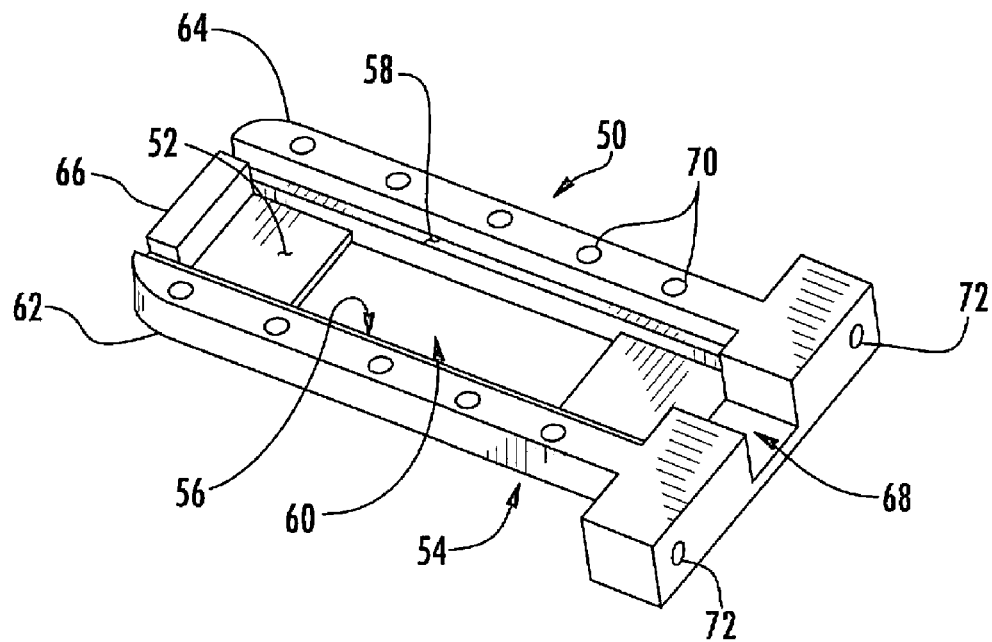
FIG. 2

POWERED PROTRUSION CUTTER

GOVERNMENT RIGHTS

The U.S. Government has rights to this invention pursuant to contract number DE-AC05-00OR22800 between the U.S. Department of Energy and BWXT Y-12, L.L.C.

FIELD

This invention relates to the field of power tools. More particularly, this invention relates to power tools for cutting material protruding from a surface, such as a bolt head, rivet head, or nut.

BACKGROUND

In many manufacturing and construction activities it is frequently necessary to remove a protrusion of material from a component or from a substrate surface. Examples of such removal operations include clipping the head off a bolt and the removal of a bolt head, a nut, a rivet, a weld bead, or a temporary assembly alignment tab from a substrate surface of assembled components. These operations may be required during normal assembly, during demolition of equipment or facilities, or during product repair or manufacturing rework activities. Various tools such as bolt cutters, chisels, drills, grinders, and acetylene torches are sometimes used for removal of a protrusion of material from a substrate surface. The application of power tools often results in one or more undesirable process characteristics, such as damaging the substrate surface due to excessive temperature or physical marring, or failing to remove all of the protrusion of material due to a mismatch between the cutting edge of the removal tool and the substrate surface. In addition, many power tools require more time to effect the removal of a protrusion than is economically desirable. Manually-powered tools not only suffer from some of the same undesirable characteristics of powered tools, they also are generally limited to removal of small quantities of small protrusions because of the physical strength and endurance limits of an operator. What are needed therefore are improved tools for economically, quickly and easily removing a protrusion of material from a component or from a substrate surface.

SUMMARY

The present invention provides an apparatus for clipping a protrusion of material. The apparatus includes a shearing block that has a shearing edge for engaging a first portion of the protrusion of material and a cutting blade that has a cutting edge for clipping the protrusion of material as the cutting blade engages an opposing portion of the protrusion of material. In this embodiment a mounting structure is configured to confine the shearing block and the cutting blade and to permit a range of relative movement between the shearing edge and the cutting edge where the range of relative movement is within a first substantially flat plane defined by the shearing edge and the cutting edge through the range of relative movement. An actuator is configured to move the cutting edge toward the shearing edge in the first substantially flat plane and to move the cutting edge away from the shearing edge.

Another embodiment of an apparatus for clipping a protrusion of material is provided. In this embodiment the apparatus includes a shearing block that has a shearing edge for engaging a first portion of the protrusion of material and a cutting blade that has a cutting edge for clipping the protrusion of material as the cutting blade engages an opposing portion of the protrusion of material. The cutting edge and the shearing edge have a substantially parallel orientation. There is a parallel guide that is configured to confine the shearing block and the cutting blade and to permit a range of relative movement between the shearing edge and the cutting edge wherein the parallel orientation of the shearing edge and the cutting edge is maintained through the range of relative movement. An actuator is configured to move the cutting edge toward the shearing edge in the first substantially flat plane and to move the cutting edge away from the shearing edge.

A further embodiment of an apparatus for clipping a protrusion of material includes a shearing block having a shearing edge for engaging a first portion of the protrusion of material and a cutting blade having a cutting edge for clipping the protrusion of material as the cutting blade engages an opposing portion of the protrusion of material. There is a mounting structure that is configured to confine the shearing block and the cutting blade and to permit a range of relative movement between the shearing edge and the cutting edge. An actuator is configured to move the cutting edge toward the shearing edge by actuation of a momentary switch that is proximate to the apparatus. The actuator is further configured to move the cutting edge away from the shearing edge.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIG. 1A is a perspective illustration of a receiving block.

FIG. 1B is a perspective illustration of a cleaver.

FIG. 1C is a perspective illustration of a cutting blade.

FIG. 2 is a perspective illustration of a mounting plate for holding cutting blades.

DETAILED DESCRIPTION

Figure 3:
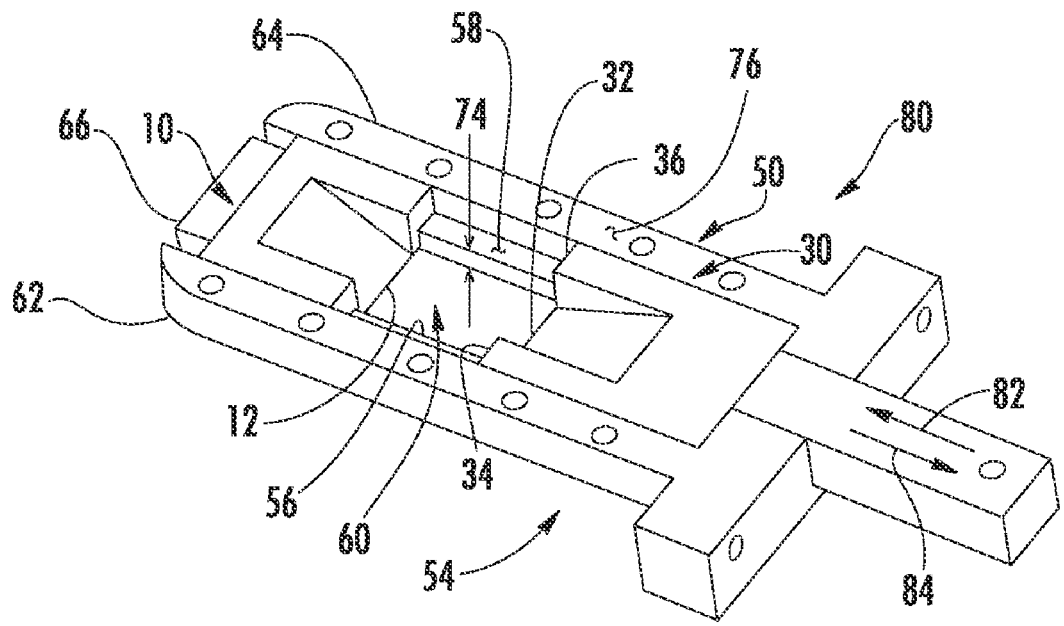
FIG. 3 is a perspective illustration of the cutting blade of FIG. 1C and the cleaver of FIG. 1B assembled with the mounting plate of FIG. 2.

In the following detailed description of the preferred embodiments, reference is made to the accompanying drawings, which form a part hereof, and within which are shown by way of illustration specific embodiments by which an apparatus for clipping a protrusion of material may be practiced. It is to be understood that other embodiments may be utilized, and that structural changes may be made and processes may vary in other embodiments.

FIG. 1A illustrates a receiving block 2. The receiving block 2 may be used to brace a protrusion of material so that it may be cut off. The receiving block 2 has a receiving surface 4 and a receiving edge 6. The receiving edge 6 is characterized by being on the geometric plane where the protrusion of material is cut off. The receiving edge 6 is further characterized by being configured for being positioned on the surface of a substrate bearing a protrusion.

FIG. 1B illustrates a cleaver 10. The cleaver 10 may be used instead of the receiving block 2 of FIG. 1A to facilitate the clipping of a protrusion of material. The receiving block 2 of FIG. 1A and the cleaver 10 of FIG. 1B are examples of "shearing blocks." The cleaver 10 has a cleaving edge 12 and a first rail 14 and a second rail 16. The cleaving edge 12 is characterized by being on the geometric plane where the protrusion of material is cut off. The cleaving edge 12 is further characterized by being configured for being positioned on the surface of a substrate bearing a protrusion. The receiving edge 6 of FIG. 1A and the cleaving edge 12 of FIG. 1B are examples of "shearing edges." The cleaver 10 of FIG. 1B is a preferred configuration of a shearing block because its cleaving edge 12 assists in clipping the protrusion of material. The cleaver 10 will be used hereinafter to illustrate the usage of a shearing block.

FIG. 1C illustrates a cutting blade 30. The cutting blade 30 may be used to cut off a protrusion of material. Cutting blade 30 includes a cutting edge 32 and a third rail 34 and a fourth rail 36. The cutting edge 32 is characterized by being on the geometric plane where the protrusion of material is cut off. The cutting edge 32 is further characterized by being configured for being positioned on the surface of a substrate bearing the protrusion to be cut off. The cutting blade 30 also includes a tang 38 and the tang 38 includes a post mounting hole 40.

FIG. 2 illustrates a mounting plate 50 for holding shearing blocks and cutting blades. The mounting plate 50 has a sole 52 with a sole under-surface 54. The sole 52 includes a first track 56 and a second track 58. An opening 60 is provided between the first track 56 and the second track 58. The mounting plate 50 further includes a first side member 62, a second side member 64, and an end block 66. The mounting plate 50 also has a tang slot 68 and ten threaded plate holes 70 and two housing mount holes 72.

FIG. 3 illustrates a blade assembly 80. Blade assembly 80 includes the cleaver 10, the cutting blade 30 and the mounting plate 50 (from FIGS. 1B, 1C, and 2 respectively). The end block 66 and portions of the first side member 62 and the second side member 64 and the sole 52 (FIG. 2) form a "base," and the cleaver 10 is held by the base in a configuration that is substantially stationary relative to the mounting plate 50, by a suitable fastening mechanism. In some embodiments the end block 66 may serve the function of a shearing block, obviating the need for a removable shearing block such as the cleaver 10. However, the use of a removable shearing block, such as the cleaver 10, is preferred because it may be more easily replaced when the shearing edge (cleaving edge 12) becomes worn with usage.

The cutting blade 30 is disposed on the first track 56 and the second track 58 of the mounting plate 50. The first track 56 and the second track 58 are an example of a "track system." The third rail 34 and the fourth rail 36 of the cutting blade 30 depicted in FIG. 1C are an example of a "rail system." The track system formed by the first track 56 and the second track 58 is configured to slidably support the rail system formed by third rail 34 and fourth rail 36. "Slidably support" means that the cutting blade 30 may slide toward the cleaver 10 in direction 82, and furthermore, after the cutting blade 30 has slid toward the cleaver 10 (from its position depicted in FIG. 3), the cutting blade 30 may slide away from the cleaver 10 in direction 84.

The previously-described base, (i.e., the end block 66 and portions of the first side member 62 and the second side member 64 and the sole 52) "confines" the cleaver 10. The first track 56 and the second track 58 "confine" the cutting blade 30. A cutting blade may be "confined" by being held substantially stationary relative to a structure (as the cleaver 10 is held by the base), or a cutting blade may be confined by being restricted to a range of motion by the mounting structure (as the cutting blade is held by the track system). A structure that confines one or more cutting blades or confines one or more shearing blocks is referred to herein as a "mounting structure."

The cleaving edge 12 and the cutting edge 32, as illustrated in FIG. 3, have a substantially parallel orientation to each other. When the cutting edge 32 slides toward or away from the cleaving edge 12, the substantially parallel orientation between the cleaving edge 12 and the cutting edge 32 is maintained. In view of the parallel orientation of the cleaving edge 12 and the cutting edge 32 that is maintained by the first track 56 and the second track 58, that track system is an example of a "parallel guide." A parallel guide is an example of a mounting structure.

In the embodiment of FIG. 3 the cleaver 10 and the cutting blade 30 are detachably held by the parallel guide (i.e., detachably held by the first track 56 and the second track 58). "Detachably held" means that the cleaver 10 and the cutting blade 30 are separable from the parallel guide without damage to any of the components. A configuration where cutting blades are detachably held is advantageous because the blades may be removed for sharpening or replacement when needed.

When the cutting edge 32 slides toward or away from the cleaving edge 12 the relative movement between cleaving edge 12 and cutting edge 32 is within a first substantially flat plane that, in this embodiment, is substantially co-planar with the sole under-surface 54 of the mounting plate 50. The parallel guide established by the track system formed by the first track 56 and the second track 58 has a top surface forming a second substantially flat plane, and the first substantially flat plane is offset from the second substantially flat plane by distance 74. This second substantially flat plane is preferably above the sole under-surface 54 of the mounting plate 50. This second substantially flat plane is below a third substantially flat plane defined by an upper surface 76 of the mounting plate 50. In the embodiment of FIG. 3, when the sole under-surface 54 of the mounting plate 50 is placed on a substrate surface with a protrusion of material (e.g., a bolt head) projecting into the opening 60, the offset between the first substantially flat plane and the second substantially flat plane permits the cleaving edge 12 and the cutting edge 32 to shear the protrusion of material substantially flush with the substrate surface.

In the embodiment of FIG. 3 the range of relative movement between the cleaving edge 12 and the cutting edge cutting edge 32 is achieved by movement relative to the base of only the cutting edge 32. In alternative embodiments, a range of relative movement between a cleaving edge and a cutting edge may be achieved by movement of both the cleaving edge and a cutting edge relative to a base.

Figure 4:
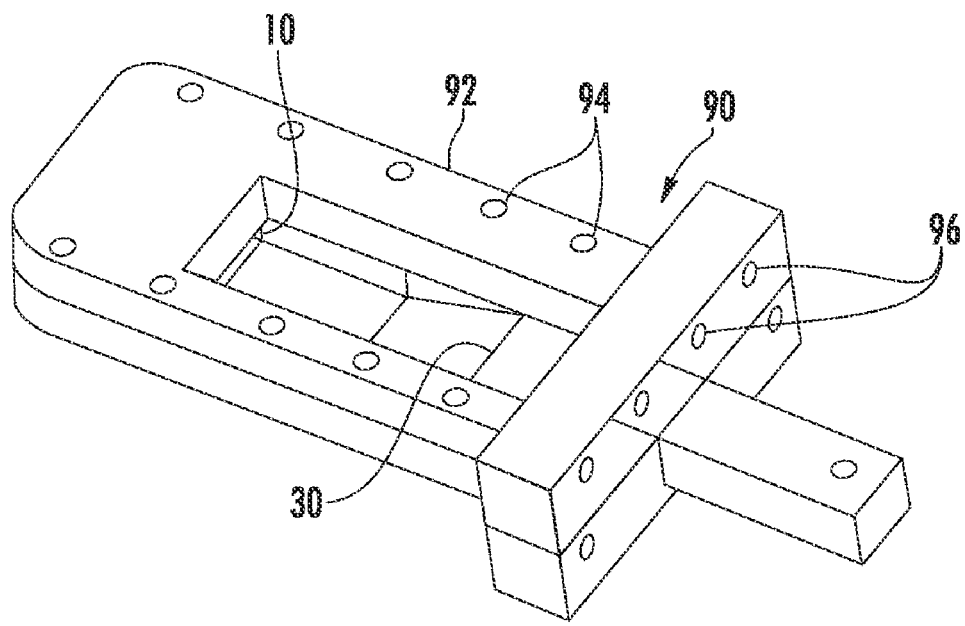
FIG. 4 is a perspective illustration of a retaining plate assembly, adding a top plate to the elements depicted in FIG. 3.

FIG. 4 illustrates a retaining plate assembly 90. The retaining plate assembly includes a top plate 92 that is disposed atop the components depicted in FIG. 3. In this embodiment top plate 92 has a pattern of ten plate holes 94 that match the pattern of the ten threaded plate holes 70 of FIG. 2, and the top plate 92 has four housing mount holes 96. In some embodiments the mounting plate 50 (FIG. 2) and the mounting plate 90 (FIG. 3) may have more or less than ten threaded plate holes 70 and ten plate holes 94 (respectively), but the number of the plate holes 94 typically matches the number and pattern of the threaded plate holes 70. Top plate 92 is configured to cooperate with the parallel guide formed by the first track 56 and the second track 58 (FIGS. 2 and 3) that is configured to further confine the cleaver 10 and the cutting blade 30 and permit relative movement between the cleaver 10 and the cutting blade 30.

Figure 5:
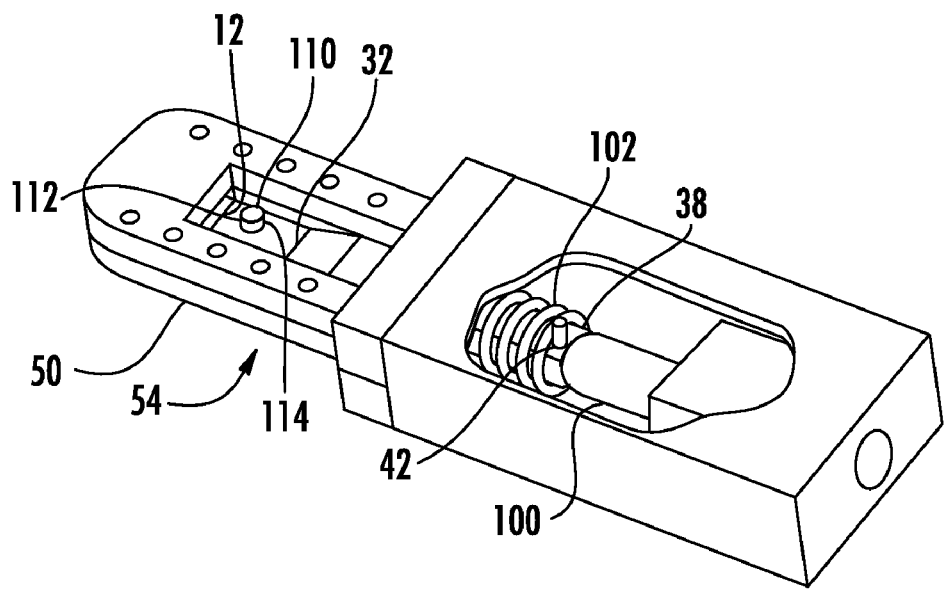
FIG. 5 is a perspective illustration of a power device and a retraction device assembled with the elements depicted in FIG. 4.

FIG. 5 illustrates further components assembled with the components of FIG. 4. A hydraulic ram 100 is coupled to the cutting blade 30 by the tang 38. The hydraulic ram 100 is an example of a power device. Furthermore, the hydraulic ram 100 in the embodiment of FIG. 5 is an example of a power device that when activated is configured to move the cutting edge 32 of the cutting blade 30 toward the cleaving edge 12 of the cleaver 10 in the previously-described first substantially flat plane that is substantially co-planar with the sole undersurface 54 of the mounting plate 50.

FIG. 5 also illustrates a spring 102 that presses against a post 42 inserted into the post mounting hole 40 (FIG. 1C). Spring 102 is an example of a retraction device configured to move the cutting edge 32 away from the cleaving edge 12 when the hydraulic ram 100 is deactivated. An actuator is a component that acts as a power device and as a retraction device. In some embodiments the power device portion of an actuator is separate from the retraction device portion, such as with hydraulic ram 100 and spring 102. In some embodiments the power device portion of an actuator and the retraction device portion of an actuator are combined into a single mechanism, such as a double-acting hydraulic ram.

Relative movement between a cutting edge and a shearing edge is achieved by propelling the cutting edge and the shearing edge together in a mounting structure, and by repelling the cutting edge and the shearing edge apart. In some embodiments this propelling and repelling may be achieved by an actuator that is coupled to a cutting blade (such as hydraulic ram 100 is coupled to the cutting blade 30 by the tang 38 in FIG. 5) to move a cutting edge (e.g., cutting edge 32) toward a shearing edge (e.g., the cleaving edge 12) that remains substantially stationary with respect to the mounting structure. In alternative embodiments the propelling and repelling may be achieved by an actuator coupled to a shearing block (e.g., the cleaver 10) to move a shearing edge (e.g., the cleaving edge 12) toward a cutting edge (e.g., the cutting edge 32) while the cutting edge remains substantially stationary with respect to the mounting structure. In some embodiments the propelling and repelling is achieved by relative motion of the cutting edge and the shearing edge with respect to the mounting structure.

FIG. 5 also illustrates a protrusion of material 110 that is positioned for clipping. The cleaving edge 12 (which is an example of a shearing edge) is configured to engage a first portion 112 of the protrusion of material 110 and the cutting edge 32 is configured to engage an opposing second portion 114 of the protrusion of material 110 for clipping the protrusion of material 110.

Figure 6:
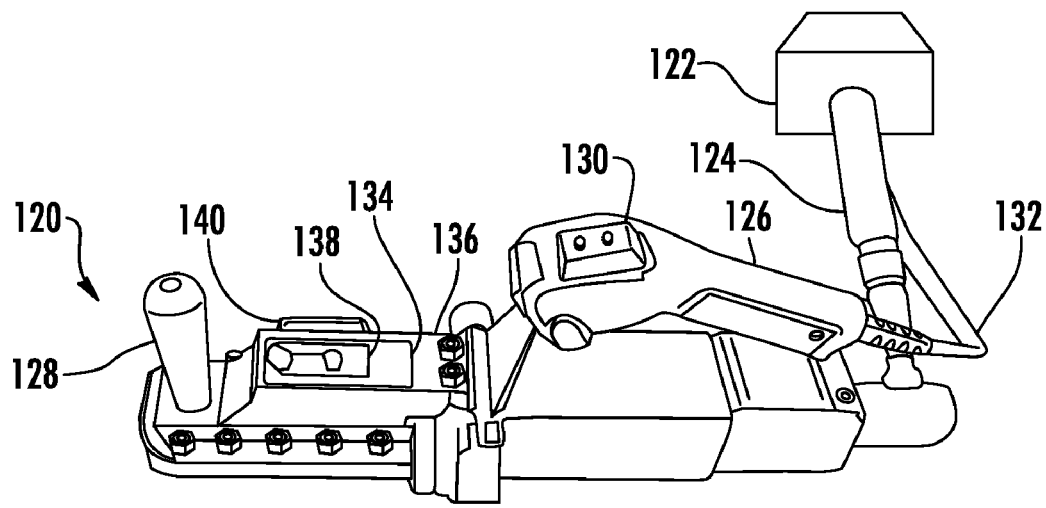
FIG. 6 is a perspective illustration of an apparatus for clipping a protrusion of material.

FIG. 6 illustrates further features of an embodiment of an apparatus 120 for clipping a protrusion of material. The apparatus 120 includes the elements depicted in FIGS. 1A, 1B, 1C, 2, 3, 4, and 5. The apparatus 120 is attached to a pump 122 that is used to pressurize a hydraulic ram (i.e., the hydraulic ram 100 of FIG. 5) through a pressure line 124. In the embodiment of FIG. 6 the apparatus 120 also includes a handle 126 and a knob 128 that may be used to position the apparatus 120 over a protrusion of material on a substrate. Knob 128 may include a threaded extension that holds cleaver 10 (FIG. 3) stationary with respect to mounting plate 50 (FIG. 3). In this embodiment a momentary switch 130 is installed on the handle 126, and the momentary switch 130 is used to actuate the pump 122 through a control line 132. The momentary switch 130 installed on the handle 126 as illustrated in FIG. 6 is an example of a momentary switch proximate to an apparatus (e.g., apparatus 120).

Typically the pump 122 is electric powered and the momentary switch 130 is an electrical switch and the control line 132 is an electrical line. When momentary switch 130 is depressed, a signal (typically an electrical continuity) is established through control line 132 to actuate the pump 122. When the pump 122 is actuated the hydraulic ram 100 (FIG. 5) is pressurized through pressure line 124. As hydraulic ram 100 is pressurized it moves the cutting edge 32 toward the cleaving edge 12. The longer that momentary switch 130 is depressed, the higher the pressure that is provided to the hydraulic ram 100 (up to the design limit of the pump 122). This configuration allows the apparatus 120 to use only the minimum amount of power required to cut the protrusion. When the momentary switch 130 is released, a signal (typically an electrical discontinuity) is established through control line 132 to de-actuate the pump 122. When the pump 122 is de-actuated the hydraulic ram 100 is depressurized and a retraction mechanism (e.g., spring 102 of FIG. 5) moves the cutting edge 32 away from the cleaving edge 12.

The apparatus 120 in FIG. 6 also includes an observation window 134 that is configured to permit an operator to view the cleaving edge (e.g., the cleaving edge 12 in FIG. 3) and the cutting edge (e.g., the cutting edge 32 in FIG. 3) while a protrusion is clipped by the apparatus 120. The apparatus 120 also includes a capture box 136. In the embodiment of FIG. 6 the observation window 134 is installed in the capture box 136, but in other embodiments an observation window may be otherwise configured. The capture box 136 is configured to preferentially collect the protrusion of material clipped by the apparatus 120. The term "preferentially collect" refers to an arrangement where the capture box is configured to collect most, but not necessarily all, portions of protrusions of material clipped by the apparatus 120. For example, in the embodiment of FIG. 6, the capture box 136 includes an opening 138 to permit easy removal of protrusions clipped by the apparatus 120. The opening 138 may permit a particular clipped protrusion or a portion of a particular clipped protrusion to eject from the apparatus 120 without collection by the capture box 136. To reduce the risk of injury to an operator form such an ejection, the embodiment of FIG. 6 includes a deflection plate 140 that is configured to deflect away from the operator a flying protrusion of material ejected through the opening 138.

In summary, the embodiments disclosed herein describe various features of an apparatus for clipping a protrusion of material. The foregoing descriptions of these embodiments have been presented for purposes of illustration and exposition. They are not intended to be exhaustive or to limit the claimed invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for clipping a protrusion of material, the apparatus comprising:

a shearing block having a shearing edge for engaging a first portion of the protrusion of material;

a cutting blade having a cutting edge for clipping the protrusion of material as the cutting blade engages an opposing second portion of the protrusion of material;

a mounting structure having a sole with an under-surface wherein the mounting structure confines the shearing block and the cutting blade and permits a range of relative movement between the shearing edge and the cutting edge for clipping the protrusion of material such that the relative movement between the shearing edge and the cutting edge is within a first substantially flat plane that is substantially co-planar with the under-surface of the sole;

wherein the mounting structure comprises a mounting plate having an upper surface and wherein the relative movement between the sharing edge and the cutting edge is within the first substantially flat plane and wherein the mounting structure comprises a parallel guide having a top surface forming a second substantially flat plane that is offset from the first substantially flat plane and wherein the upper surface forms a third substantially flat plane that is offset from the second substantially flat plane and that is offset from the first substantially flat plane;

an actuator configured to move the cutting edge toward the shearing edge by actuation of a momentary switch proximate to the apparatus and the actuator being further configured to move the cutting edge away from the shearing edge.

2. The apparatus of claim 1 wherein the shearing block is a cleaver and the shearing edge is a cleaving edge.

3. The apparatus of claim 1 wherein the shearing block comprises an end block.

4. An apparatus for clipping a protrusion of material on a surface of a substrate comprising:

a shearing block having a shearing edge for engaging a first portion of the protrusion of material;

a cutting blade having a cutting edge for clipping the protrusion of material as the cutting blade engages an opposing second portion of the protrusion of material;

a mounting structure having a sole with an under-surface for placing on the surface of the substrate, wherein the mounting structure confines the shearing block and the cutting blade and permits a range of relative movement between the shearing edge and the cutting edge for clipping the protrusion of material such that the relative movement of the cutting edge is within a first substantially flat plane that is substantially co-planar with the under-surface of the sole, wherein the cutting edge is on the surface of the substrate over the range of relative motion;

an actuator configured to move the cutting edge toward the shearing edge by actuation of a momentary switch proximate to the apparatus and the actuator being further configured to move the cutting edge away from the shearing edge; and wherein the mounting structure comprises a mounting plate having an upper surface and wherein the relative movement between the sharing edge and the cutting edge is within the first substantially flat plane and wherein the mounting structure comprises a parallel guide having a top surface forming a second substantially flat plane that is offset from the first substantially flat plane and wherein the upper surface forms a third substantially flat plane that is offset from the second substantially flat plane and that is offset from the first substantially flat plane.

5. The apparatus of claim 4 wherein the shearing block is a cleaver and the shearing edge is a cleaving edge.

6. The apparatus of claim 4 wherein the shearing block comprises an end block.

7. An apparatus for clipping a protrusion of material comprising:

a shearing block having a shearing edge for engaging a first portion of the protrusion of material;

a cutting blade having a cutting edge for clipping the protrusion of material as the cutting blade engages an opposing second portion of the protrusion of material;

a mounting structure comprising a mounting plate having an upper surface and having a sole with an under-surface wherein the mounting structure comprises a parallel guide having a top surface forming a first substantially flat plane and the upper surface forming a second substantially flat plane that is offset from the first substantially flat plane, and the mounting structure confines the shearing block and the cutting blade and permits a range of relative movement between the shearing edge and the cutting edge for clipping the protrusion of material such that the relative movement of the cutting edge is within a third substantially flat plane that is offset from the first substantially flat plane and that is offset from the second substantially flat plane and that is not between the first substantially flat plane and the second substantially flat plane; and an actuator configured to move the cutting edge toward the shearing edge by actuation of a momentary switch proximate to the apparatus and the actuator being further configured to move the cutting edge away from the shearing edge.

8. The apparatus of claim 7 wherein the shearing block is a cleaver and the shearing edge is a cleaving edge.

9. The apparatus of claim 7 wherein the shearing block comprises an end block.

* * * * *